United States Patent
Karpenko (10) Patent No.: US 9,307,149 B2
(45) Date of Patent: *Apr. 5, 2016

(54) APPLYING VIDEO STABILIZATION TO A MULTIMEDIA CLIP

(71) Applicant: Facebook, Inc., Menlo Park, CA (US)

(72) Inventor: Alexandre Karpenko, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/678,833

(22) Filed: Apr. 3, 2015

(65) Prior Publication Data

US 2015/0215540 A1   Jul. 30, 2015

Related U.S. Application Data

(63) Continuation of application No. 14/052,001, filed on Oct. 11, 2013, now Pat. No. 9,066,014.

(51) Int. Cl.
*H04N 5/232* (2006.01)

(52) U.S. Cl.
CPC ....... *H04N 5/23267* (2013.01); *H04N 5/23258* (2013.01); *H04N 5/23264* (2013.01)

(58) Field of Classification Search
CPC .......... H04N 5/23248; H04N 5/23251; H04N 5/144; H04N 5/145; H04N 5/23254; H04N 5/23264; H04N 5/23267
See application file for complete search history.

(56) References Cited

U.S. PATENT DOCUMENTS

| | | | |
|---|---|---|---|
| 9,066,014 B2 * | 6/2015 | Karpenko | H04N 5/23264 |
| 2009/0290028 A1 * | 11/2009 | Yamasaki | H04N 5/23212 348/208.1 |
| 2012/0188386 A1 * | 7/2012 | Kulkarni | H04N 5/23212 348/208.11 |
| 2014/0204228 A1 * | 7/2014 | Yokokawa | H04N 5/23254 348/208.6 |
| 2015/0215540 A1 * | 7/2015 | Karpenko | H04N 5/23264 348/208.5 |

* cited by examiner

*Primary Examiner* — Aung S Moe
(74) *Attorney, Agent, or Firm* — Baker Botts L.L.P.

(57) ABSTRACT

In one embodiment, a method includes determining one or more amounts of light present during recording of a multimedia clip. The method also includes determining a motion-blur metric for the multimedia clip, the motion-blur metric based at least in part on the amounts of light. The method further includes determining whether to apply a video-stabilization routine to the multimedia clip based at least in part on the motion-blur metric.

36 Claims, 5 Drawing Sheets

APPLYING VIDEO STABILIZATION TO A MULTIMEDIA CLIP

PRIORITY

This application is a continuation under 35 U.S.C. §120 of U.S. patent application Ser. No. 14/052,001, filed 11 Oct. 2013.

TECHNICAL FIELD

This disclosure generally relates to video stabilization of a multimedia clip.

BACKGROUND

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

A mobile computing device that includes a digital camera may be used to record a multimedia clip, such as for example a digital video clip. During recording, unintended movement of a camera, or camera shake, whether caused by shaking hands or other vibration sources, can lead to undesirable effects in videos, such as a shaky or jerky motion of a video. In particular embodiments, a video-stabilization routine may be applied to a multimedia clip or a particular length of video to reduce the effects of camera shake when the video is viewed or played back. There are numerous video-stabilization (or, image-stabilization) techniques that can be applied to digital videos to reduce the effect of camera shake. This disclosure contemplates any suitable video-stabilization technique. In particular embodiments, a video-stabilization technique may lead to undesirable motion blur (or, motion-blur artifacts) in a video, where motion blur refers to a smearing, blurring, or bleeding-out of video images caused by motion of a camera during recording. Motion blur can occur when a camera collects light for a particular image frame of video, and as it collects light, the camera may move, in part due to camera shake. This camera motion may create a motion trail in the image, and, while applying image stabilization may reduce the shaky or jerky motion of a video caused by camera shake during recording, image stabilization generally does not modify the pixels of the image. That is, some pixels may still contain a motion trail, which can produce a motion-blur artifact, and so, after an image stabilization routine is applied to a multimedia clip, motion blur artifacts may remain in the video.

Motion blur, while generally undesirable, may not be too apparent or problematic in a shaky video because the shaky video and the motion blur generally occur together in a synchronized fashion. In particular embodiments, once a video-stabilization technique is applied, a motion-blur artifact can appear peculiar or unpleasant to a viewer and can be quite noticeable because the camera shake that produced the motion blur has been reduced or removed from the video, leaving just the motion-blur artifact without the associated motion. In particular embodiments, a computing device may determine whether to apply video stabilization to a particular multimedia clip to reduce the effects of camera shake while not introducing unwanted motion-blur artifacts. In particular embodiments, if it is determined that a multimedia clip may contain excessive motion-blur artifacts after applying video stabilization, then a computing device may determine not to apply video stabilization to that multimedia clip.

In particular embodiments, one factor that may be used in a determination of whether or not to apply video stabilization is the amount of camera movement during recording, since excessive camera movement can lead to motion blur. In particular embodiments, another factor that may be used to determine whether or not to apply video stabilization is the amount of light present while recording a video. If there is a low-light condition, the exposure time may be long enough and the camera may move enough to make motion blur a problem. In particular embodiments, in a low-light condition, a camera's relatively long shutter time may lead to motion blur, and it may be determined that image stabilization should be disabled for a particular multimedia clip recorded under such low-light conditions. In particular embodiments, it may be determined to not stabilize a particular multimedia clip because a motion-blur artifact may create an unpleasant effect in the stabilized video. In particular embodiments, a particular multimedia clip may have video stabilization enabled if it is determined that the stabilized multimedia clip will not contain a significant amount of motion blur. In particular embodiments, a computing device may not attempt to remove a motion-blur artifact from a multimedia clip, and a computing device may make a determination of whether or not to enable image stabilization. In particular embodiments, a determination of whether or not to apply video stabilization may be made on a per-clip basis, or it can be applied to an entire video or any suitable subset of a multimedia clip.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
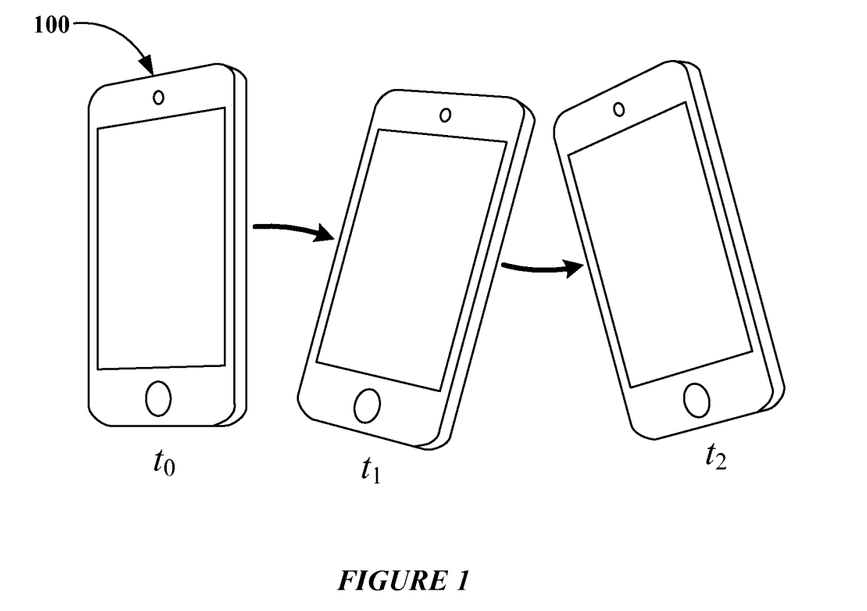
FIG. 1 illustrates an example mobile computing device undergoing example movements.

FIG. 1 illustrates an example mobile computing device 100 undergoing example physical movements. In particular embodiments, mobile computing device 100 may be a single-board computer (SBC) (such as, for example, a computer-on-module (COM) or system-on-module (SOM)), a laptop or notebook computer, a mobile telephone, a smartphone, a digital camera, a personal digital assistant (PDA), a tablet computer system, or a combination of two or more of these. Mobile computing device 100 may include one or more integrated cameras or an interface to one or more external cameras. In particular embodiments, mobile computing device 100 may include one or more digital cameras, where a digital camera may refer to a device that records or stores images or videos in a digital format. Herein, the term "camera" may refer to a digital camera, and the term "multimedia clip" may refer to digital video, or video recorded or stored in a digital format. In particular embodiments, the term multimedia clip may refer to a discrete section or a particular length of a video recording. In particular embodiments, a multimedia clip may be referred to as a multimedia video clip, multimedia image, digital video clip, video clip, or video. In particular embodiments, a digital camera may include an image sensor, such as for example a charge-coupled device (CCD) image sensor or a complementary metal-oxide-semiconductor (CMOS) active-pixel sensor. This disclosure contemplates any suitable mobile computing device 100 taking any suitable physical form and including any suitable camera.

A physical movement (or, movement) of mobile computing device 100, as illustrated in FIG. 1, may include a rotational or translational displacement, velocity, or acceleration, or any suitable combination thereof. Although this disclosure describes or illustrates particular movements of mobile computing device 100, including rotational or translational displacement, velocity, or acceleration, this disclosure contemplates any suitable movements or combinations of suitable movements. In particular embodiments, mobile computing device 100 may include one or more types of sensors for detecting position, orientation, translational movement, or rotational movement of mobile computing device 100. Such motion sensors may include an accelerometer, gyroscope, or magnetometer, or any suitable combination thereof. Mobile computing device 100 may also include an interface to one or more external sensors for detecting position or movement. Although this disclosure describes particular sensors for detecting position, orientation, or movement of mobile computing device 100, this disclosure contemplates any suitable sensors for detecting position, orientation, or movement.

In particular embodiments, data, information, or values from one or more sensors may be recorded or analyzed concurrent with the recording of a multimedia clip, and the sensor values may be used in a determination of whether to apply video stabilization to a multimedia clip. In particular embodiments, the term multimedia clip may refer to a discrete section or a particular length of a video recording. In particular embodiments, a multimedia clip may refer to any suitable length of recorded video that occurs in a single recording event, such as for example with a single initiation of a recording (e.g., pressing a "Record" button) followed at a later time by a single termination of a recording (e.g., pressing a "Stop" button). In particular embodiments, a multimedia clip may refer to any suitable combination or series of two or more video recording events. In particular embodiments, a multimedia clip may have a duration of 1 second, 10 seconds, 15 seconds, 1 minute, 20 minutes, 1 hour, or any suitable duration. In particular embodiments, an image frame may refer to a single still image of a multimedia clip, and a multimedia clip may include one or more image frames combined together to form a video recording. In particular embodiments, a multimedia clip may have a frame rate of 24 frames per second (FPS), 25 FPS, 30 FPS, or any suitable frame rate, where frame rate may refer to a number of still images or video frames per second of a video while being recorded or played back. Although this disclosure describes and illustrates particular multimedia clips having particular durations and frame rates and including one or more recording events, this disclosure contemplates any suitable multimedia clips including any suitable number of recording events and having any suitable durations and frame rates.

In particular embodiments, movements of a mobile computing device 100 may be determined by information or values received from one or more motion sensors (e.g., gyroscope, magnetometer, accelerometer) integrated with mobile computing device 100. In particular embodiments, mobile computing device 100 may be a smartphone that includes a camera and a gyroscope sensor. In particular embodiments, a motion sensor integrated with a mobile computing device 100 may include a vibrating-structure gyroscope manufactured with micro-electro-mechanical systems (MEMS) technology. In particular embodiments, a gyroscope may be used to determine rotational orientation or rotational movement versus time of mobile computing device 100. In particular embodiments, a gyroscope may be a rate gyroscope that determines rotational (or angular) velocity. As an example and not by way of limitation, a rate gyroscope may provide data, information, or values that correspond to angular velocity in units of radians/s or degrees/s. In particular embodiments, a rotational (or angular) orientation of a mobile computing device 100 may be determined by integration of gyroscope sensor data with respect to time. In particular embodiments, angular orientation θ(t) may represent an angle of a camera with respect to time and relative to one or more axes of a particular two- or three-dimensional coordinate system. In particular embodiments, angular orientation or motion may be determined in reference to various rotational axes, such as for example, a pitch axis, a roll axis, or a yaw axis. In particular embodiments, integration of sensor data may be performed by summing or averaging sensor data over a particular time interval. As an example and not by way of limitation, given an initial angular orientation θ($t_1$) at a time $t_1$ and an angular velocity ω(t) as determined by a rate gyroscope, an angular orientation at a later time $t_2$ may be determined from the expression θ($t_2$)=θ($t_1$)+ω(t)×($t_2$−$t_1$). In particular embodiments, the expression ω(t) may be evaluated at a time t such that $t_1$≤t≤$t_2$. In particular embodiments, the expression ω(t) may represent an average value of ω(t) evaluated over a time interval from $t_1$ to $t_2$.

In particular embodiments, a magnetometer (e.g., a magnetic field sensor) may be used to measure orientation or rotational movement of mobile computing device 100. A magnetometer may sense the earth's magnetic field or any other suitable, substantially static magnetic field to determine an angular orientation of mobile computing device 100. In particular embodiments, an accelerometer may be used to determine a translational or rotational movement of mobile computing device 100. In particular embodiments, accelerometer sensor data may be used to determine a linear acceleration of mobile computing device 100. Moreover, integrating accelerometer data over a particular time interval may be used to determine a velocity of mobile computing device 100, and performing a second integration operation may allow determination of a position of mobile computing device 100 as a function of time. In particular embodiments, rotational or translational movement of mobile computing device 100 may be determined by analyzing images that make up a multimedia clip. As an example and not by way of limitation, feature-based analysis may be used to track one or more features (e.g., distinct, stationary objects or edges) in images of a multimedia clip and determine a camera's motion from position changes of the features between images.

The example of FIG. 1 illustrates mobile computing device 100 undergoing a series of example movements which may be associated, at least in part, with camera shake. In particular embodiments, movement of mobile computing device 100 may arise from a combination of camera shake along with intended movement (e.g., panning of a camera). In particular embodiments, camera shake may refer to an unintended or unwanted movement, shake, or vibration of a camera during recording of a multimedia clip. As an example and not by way of limitation, camera shake may arise, at least in part, from movement of one or more hands while holding a camera, from movement of a person's body while holding a camera (e.g., while a person is walking, running, or jumping), or from movement of an object where a camera is located (e.g., motion of a helmet, bike, airplane, train, or car from which a video is being recorded). This disclosure contemplates any suitable camera shake arising from any suitable one or more sources.

In FIG. 1, movements may include one or more rotations, translations, or any suitable combination of one or more rotations or translations of mobile computing device 100. Movements illustrated in FIG. 1 (and below in FIG. 2) may be exaggerated for clarity. In particular embodiments, rotations associated with camera shake may have a magnitude on the order of approximately 0.5 to 10 degrees, and translations associated with camera shake may have a magnitude on the order of approximately 0.5 to 10 millimeters. In FIG. 1, mobile computing device 100 may have an initial orientation at time $t_0$ (left of FIG. 1), may move to another orientation at time $t_1$ (middle of FIG. 1), and then may move to another orientation at time $t_2$ (right of FIG. 2). In FIG. 1, movements of mobile computing device 100 may include rotation, translation, or both rotation and translation. In particular embodiments, a computing device may determine whether to enable video stabilization based on the rotational motion, the translational motion, or both the rotational and translational motion of mobile computing device 100. In particular embodiments, a mobile computing device 100 may undergo movements that may include both rotational and translational motion, and a computing device may determine whether to enable video stabilization based on the rotational motion of mobile computing device 100. Although this disclosure describes and illustrates particular movements of a mobile computing device 100 having particular magnitudes, this disclosure contemplates any suitable movements of a mobile computing device 100 having any suitable magnitude.

Figure 2:
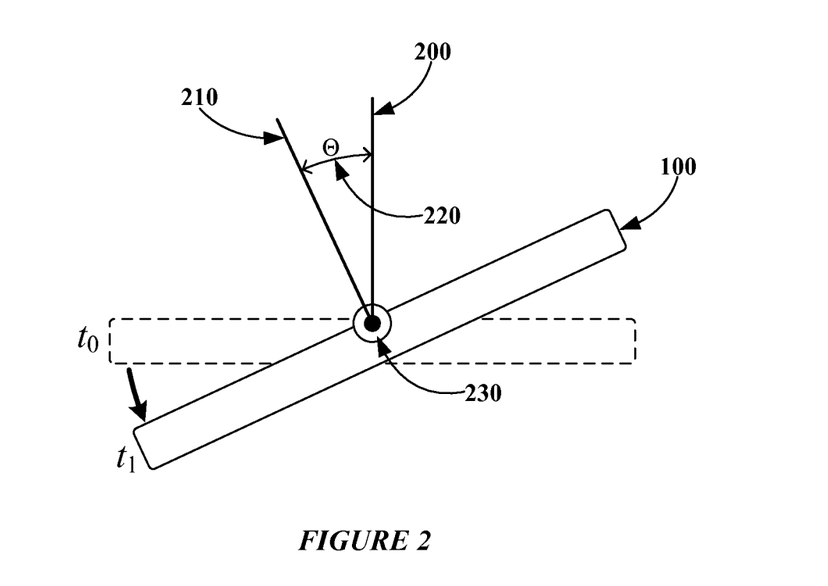
FIG. 2 illustrates an example mobile computing device undergoing an example rotation.

FIG. 2 illustrates a top-view of an example mobile computing device 100 undergoing an example rotation by an angle Θ 220. In FIG. 2, mobile computing device 100 may include a camera, and rotation of mobile computing device 100 may result, at least in part, from camera shake. In FIG. 2, mobile computing device 100 may have an initial orientation at time $t_0$ and may be rotated by angle Θ 220 to a final orientation at time $t_1$. Lines 200 and 210 may be substantially orthogonal to a face of mobile computing device 100 where a camera or a camera lens is located. Line 200 and line 210 may indicate initial and final orientations of mobile computing device 100, respectively, and angle Θ 220 between lines 200 and 210 may represent an amount of rotation of mobile computing device 100. In FIG. 2, vector 230 may represent a motion vector associated with a rotation of mobile computing device 100 from an initial to a final orientation. Motion vector 230 may be oriented orthogonal to lines 200 and 210 and may be oriented along a rotation axis about which mobile computing device 100 is rotated.

Figure 3:
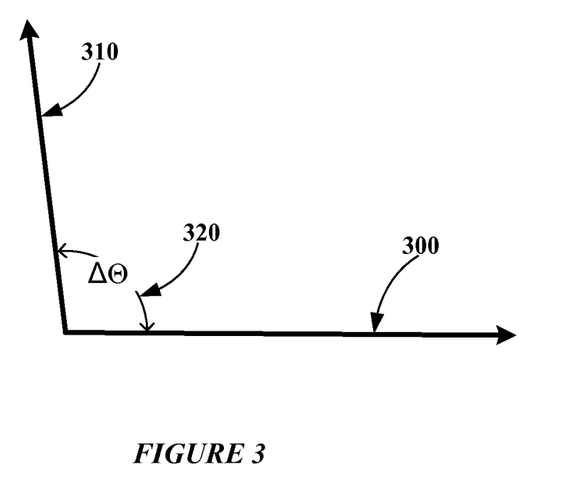
FIGS. 3-4 illustrate example movement vectors associated with example motions of a mobile computing device.
Figure 4:
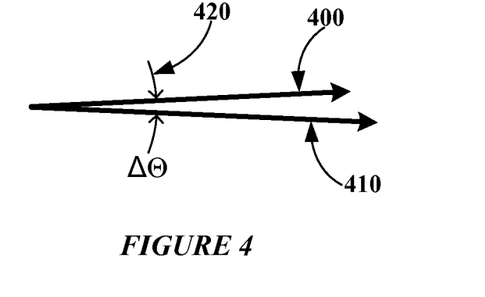

FIGS. 3 and 4 illustrate example motion vectors associated with example motions of a mobile computing device 100. In particular embodiments, rotational motion of mobile computing device 100 between two orientations may be represented by a vector oriented along an axis of rotation and having a magnitude proportional to a magnitude of rotation. In particular embodiments, quaternions, Euler angles, or rotation matrices may be used to represent or determine orientations or rotations of mobile computing device 100. Although this disclosure describes and illustrates particular representations of orientation or rotation, this disclosure contemplates any suitable representation of orientation or rotation. In particular embodiments, rotational motion or orientation may be illustrated using motion vectors, where a motion vector may represent a motion of a mobile computing device 100 from one position to another. In the example of FIG. 3, motion vectors 300 and 310 may each represent a particular rotation of mobile computing device 100 between two orientations. In the example of FIG. 4, motion vectors 400 and 410 may each represent a particular rotation of mobile computing device 100 between two orientations. In FIGS. 3 and 4, angles 320 and 420 may each represent a difference between their associated motion vectors. Angle 320 in FIG. 3 is relatively large, compared to angle 420 in FIG. 4. FIG. 3 may represent two rotational motions (300 and 310) of a mobile computing device 100 with relatively large differences between the axes of rotation of the two rotational motions. As an example and not by way of limitation, motion vector 300 in FIG. 3 may represent substantially a rolling motion of a mobile computing device 100, and motion vector 310 may represent substantially a pitching or yawing motion. FIG. 4 may represent two rotational motions (400 and 410) with relatively small differences between the axes of rotation of the two rotational motions. As an example and not by way of limitation, motion vector 400 in FIG. 4 may represent substantially a rolling motion of a mobile computing device 100, and motion vector 410 may represent another motion that is also substantially a rolling motion.

In particular embodiments, an amount of camera shake may be determined by a camera's motion or orientation from one frame to the next in a multimedia clip, as indicated, for example, by a gyroscope sensor. As an example, if a multimedia clip has motion in a particular direction for a frame, and a motion in a subsequent frame continues along substantially the same direction, then it may be determined that the camera was moving smoothly and not shaking or moving in a jerky fashion. In particular embodiments, if the camera orientation or the camera shake changes direction frequently, then there may be a problem with motion blur in a stabilized video. In particular embodiments, one or more motions with a relatively large change in motion vector angle, as illustrated in the example of FIG. 3, may indicate mobile computing device 100 undergoing one or more movements caused at least in part by camera shake. In particular embodiments, one or more motions with a relatively small change in motion vector angle, as illustrated in the example of FIG. 4, may indicate mobile computing device 100 undergoing one or more movements not associated with camera shake (e.g., camera of mobile computing device 100 may be panning). In particular embodiments, whether a mobile computing device 100 underwent one or more movements associated with camera shake during recording of a multimedia clip may be determined, at least in part, from a change between two or more motion vector angles. In particular embodiments, a routine for determining whether a mobile computing device 100 underwent one or more movements associated with camera shake during recording of a multimedia clip may use information associated with all motion vector angles or with some particular motion vector angles. As examples and not by way of limitation, such a routine may use information associated with motion vector angles or motion vector angle changes having particular orientations, time stamps, magnitudes, or ranges of magnitudes.

In particular embodiments, a motion vector may be associated with two image frames of a video clip, and a motion vector may be determined from a change in camera orientation that occurs between the two image frames. In particular embodiments, a motion vector may be associated with two image frames that follow one another in a multimedia clip and have no other image frames between them. In particular embodiments, a motion vector may be associated with two image frames of a multimedia clip that may be separated by one or more other image frames. In particular embodiments, a series of motion vectors may be determined for a video clip, and any suitable pair of image frames of a video clip may have an associated motion vector. In particular embodiments, an amount of camera shake may be quantified by determining an angle ($\Delta\Theta$) between two motion vectors, where the two motion vectors may have zero, one, or any suitable number of image frames or other motion vectors between them. In particular embodiments, a dot product between any two suitable motion vectors associated with any suitable image frames may be determined, where a dot product returns a value that is a function of the angle between the two vectors. This disclosure contemplates any suitable technique for determining angles between two motion vectors. In particular embodiments, an angle between motion vectors ($\Delta\Theta$) may be referred to as a motion change, an angular orientation change, a camera orientation change, or an orientation change.

In particular embodiments, whether to apply video stabilization to a multimedia clip may be determined, at least in part, by angles between two or more motion vectors associated with a multimedia clip. In particular embodiments, whether to apply video stabilization to a multimedia clip may be determined, at least in part, by a magnitude of one or more motion vectors associated with a multimedia clip. As an example, and not by way of limitation, a motion vector with a relatively small magnitude may indicate a relatively small magnitude of movement of a camera, which may in turn indicate a relatively small amount of motion blur. In particular embodiments, if there is a significant amount of camera shake, then there may also be a significant angle between motion vectors. In particular embodiments, the larger the angle, the more problematic motion blur may be in a stabilized multimedia clip. In particular embodiments, a low-pass filter may be applied to a camera's orientation information to obtain a camera's stabilized orientation or motion (or, synthetic- or virtual-camera orientation or motion). In particular embodiments, a motion vector may be compared with a camera's stabilized orientation or motion to determine an amount of camera shake. Although this disclosure describes and illustrates particular techniques for determining and quantifying camera shake, this disclosure contemplates any suitable technique for determining or quantifying camera shake.

In particular embodiments, a multimedia clip may be recorded at a particular frame rate, and a sensor may provide orientation information at a rate that may be the same or that may be different from the frame rate. As an example and not by way of limitation, a multimedia clip recorded at 25 FPS may have a time between a start point of successive frames of approximately 40 ms. As an example and not by way of limitation, a gyroscope sensor may provide orientation information or updates at a rate of approximately 100 Hz, corresponding to a period between updates of approximately 10 ms. In particular embodiments, determination or recording of a camera's orientation for a particular frame may occur synchronously, or at substantially the same time, as an image of the particular frame is taken or recorded. In particular embodiments, determination of a camera's orientation for a particular frame may include averaging, summing, selecting a single value, or taking a minimum or a maximum of one or more updates provided by a motion or orientation sensor. As an example an not by way of limitation, for a frame rate having approximately 40 ms between successive frames and a motion sensor with an update period of approximately 10 ms, a determination of a camera's orientation for a particular frame may include from one to four sensor readings. In particular embodiments, a multimedia clip may comprise a series of image frames, where each image frame has an associated time stamp indicating a time within the multimedia clip when an image was captured. In particular embodiments, a sensor may provide orientation information periodically, where each camera orientation has an associated time stamp. In particular embodiments, a camera orientation for a particular frame may be found by interpolating two or more camera orientations having time stamps occurring near a time stamp for a particular frame. Although this disclosure describes particular frame rates and particular motion sensor update rates, this disclosure contemplates any suitable frame rates and any suitable motion sensor update rates.

In particular embodiments, determining whether or not to apply video stabilization may be related to the amount of light present while recording a video. In particular embodiments, the amount of light present may be determined from a camera's exposure time. Exposure time (or shutter speed) may refer to how long a camera's shutter is open or how long a sampling time is used when capturing a particular image. In particular embodiments, the amount of light that reaches an image sensor of a camera may be proportional to the exposure time. In particular embodiments, techniques for determining the amount of light present may include using a light sensor integrated with a camera or analyzing frames for indication of light levels or brightness. In low-light conditions, a camera may have a relatively long exposure time, which may make a multimedia clip more susceptible to motion blur. As examples and not by way of limitation, a typical exposure time in bright light (e.g., outdoors in sunshine) may be approximately 0.5 ms, while a typical exposure time in low light (e.g., indoors or in a darkened space) may be approximately 30 ms. In bright light, motion blur may not present a significant problem because of a camera's relatively short exposure time. In particular embodiments, given a short exposure time, motion blur may arise from a relatively large amplitude or high frequency of camera motion, and significant motion blur may not occur for typical camera motions associated with camera shake. Under low-light conditions, motion blur may occur since it may be difficult to stabilize an image by holding a camera steady for a time on the order of a relatively long exposure time.

Figure 5:
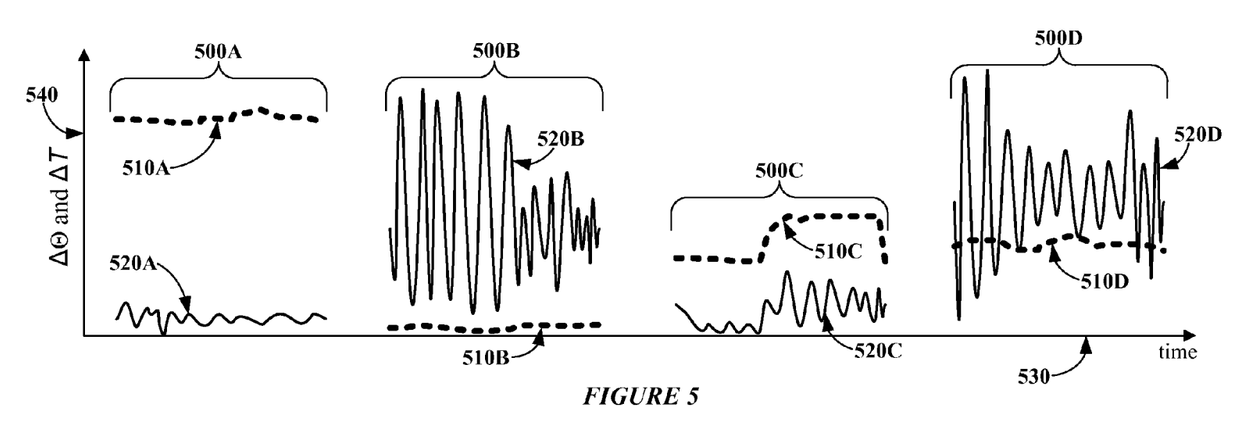
FIG. 5 illustrates example traces associated with example movements and example exposure times for several example multimedia clips.

FIG. 5 illustrates example traces or time-dependent values associated with example mobile computing device 100 movements and example exposure times for several example multimedia clips 500. In FIG. 5, for a particular multimedia clip 500, trace 510 may represent an exposure time ($\Delta T$) for frames of multimedia clip 500, and trace 520 may represent an orientation change ($\Delta\Theta$) between frames. In particular embodiments, values of orientation change 520 may be determined from motion vectors associated with multimedia clip 500. In FIG. 5, exposure time 510 and orientation change 520 are plotted along a horizontal time axis 530 and a vertical axis 540 representing exposure time and orientation change in arbitrary units. In particular embodiments, values for mobile computing device 100 exposure time 510 or orientation change 520 may be determined for each frame of a particular multimedia clip. In particular embodiments, values for mobile computing device 100 exposure time 510 or orientation change 520 may be determined for particular frames (e.g., every other frame, or every third frame) of a particular multimedia clip. In FIG. 5, multimedia clip 500A has an exposure time 510A that is relatively long, such as for example approximately 20 ms, which may indicate a video recorded in relatively low-light conditions. In FIG. 5, multimedia clip 500A has an orientation change 520A that is relatively low, which may indicate that the camera was relatively stable (e.g., a relatively small amount of camera shake) during recording.

Figure 6:
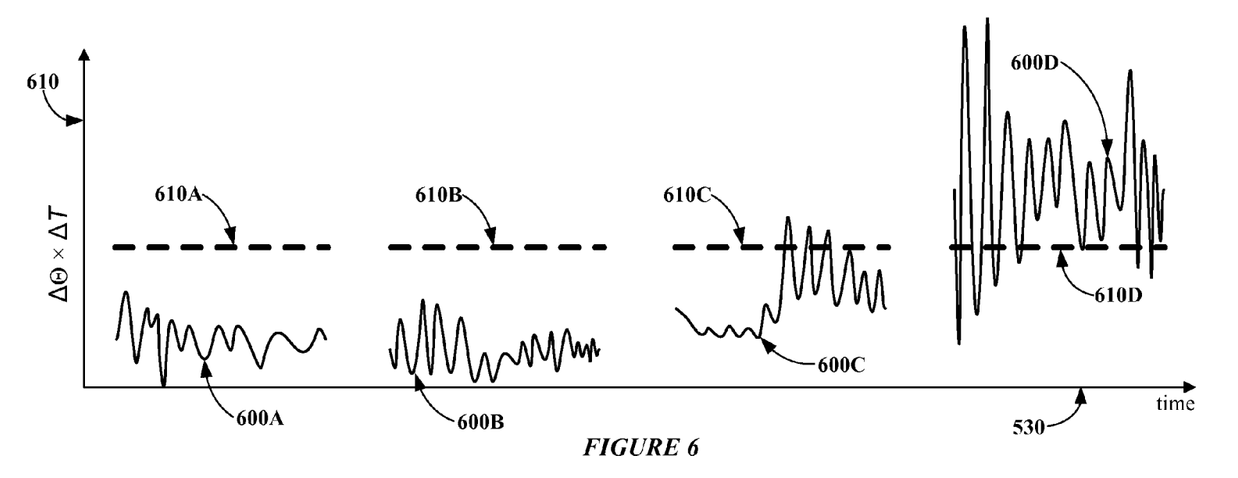
FIG. 6 illustrates example traces associated with a product of example movements and example exposure times from FIG. 5.

FIG. 6 illustrates example traces or time-dependent values associated with a product of example movements 520 and example exposure times 510 from FIG. 5. In FIG. 6, trace 600 may represent a motion-blur metric function (MBMF) for a particular multimedia clip 500. Motion-blur metric function 600, which is represented by trace 600 in FIG. 6, may be obtained by multiplying exposure time 510 and orientation change 520. In particular embodiments, motion-blur metric function 600 may be determined from the expression MBMF(t)=ΔT(t)×ΔΘ(t), and a value of motion-blur metric function 600 for a particular frame occurring at a particular time $t_i$ may be expressed as MBMF($t_i$)=Δ($t_i$)×ΔΘ($t_i$). In particular embodiments, MBMF 600 may provide an indication of motion blur in a multimedia clip 500 or a particular section of a multimedia clip if video stabilization were applied to multimedia clip 500. In particular embodiments, a value of motion-blur metric function 600 for a particular frame occurring at a particular time may provide an indication of motion blur for that particular frame. In particular embodiments, MBMF 600 may be used, at least in part, to determine whether or not to apply or enable video stabilization for a particular multimedia clip 500.

As discussed above, multimedia clip 500A may have a relatively long exposure time 510A and a relatively low amount of orientation change 520A. In FIG. 6, motion-blur metric function 600A represents a product of exposure time 510A and orientation change 520A, and a determination of whether or not to apply video stabilization to clip 500A may depend on MBMF 600A. In particular embodiments, if any part of motion-blur metric function 600 exceeds a particular threshold value 610, as indicated by line 610 in FIG. 6, then it may be determined that video stabilization should not be applied to a multimedia clip 500. In particular embodiments, if motion-blur metric function 600 exceeds a particular threshold value 610 for a particular fraction of a duration of multimedia clip 500, then it may be determined that video stabilization should not be applied to a multimedia clip 500 due to problems with motion blur in the stabilized video that may result. In particular embodiments, it may be determined not to apply video stabilization if a motion-blur metric function exceeds a predetermined threshold value 610 for greater than or equal to 1%, 2%, 5%, 10%, or any suitable percentage of a multimedia clip's duration. As an example and not by way of limitation, if a motion-blur metric function 600 exceeds a predetermined threshold value 610 for greater than or equal to 5% of a multimedia clip's duration, then it may be determined not to apply video stabilization. In particular embodiments, if motion-blur metric function 600 does not exceed a particular threshold value 610 for a particular fraction of a duration of multimedia clip 500, then it may be determined that video stabilization may be applied to multimedia clip 500, and the resulting stabilized multimedia clip may not exhibit significant problem with motion blur. In particular embodiments, it may be determined that video stabilization may be applied if a motion-blur metric function does not exceed a predetermined threshold value 610 for greater than or equal to 90%, 95%, 98%, 99%, or any suitable percentage of a multimedia clip's duration. As an example and not by way of limitation, if a motion-blur metric function 600 does not exceed a predetermined threshold value 610 for greater than or equal to 95% of a multimedia clip's duration, then it may be determined that video stabilization may be applied.

In particular embodiments, a motion-blur metric (MBM) for a multimedia clip 500 may be determined from a motion-blur metric function 600. In particular embodiments, a motion-blur metric may be determined as an average, a median, a single value, a minimum, or a maximum of MBMF 600. In particular embodiments, for a multimedia clip 500 that includes N frames, a motion-blur metric may represent an average of motion-blur metric function 600 and may be determined from the expression $$MBM = \frac{1}{N} \times \sum_{i=1}^{N} \Delta T(t_i) \times \Delta \Theta(t_i).$$

In particular embodiments, a motion-blur metric for a particular multimedia clip may be a single number or a single value. In particular embodiments, a motion-blur metric may be a measure indicating a relative amount of motion-blur artifacts due to camera shake that may be present in a stabilized multimedia clip. In particular embodiments, if a motion-blur metric for a multimedia clip 500 exceeds a predetermined threshold value 610, then it may be determined that video stabilization should not be applied to multimedia clip 500. In particular embodiments, if a motion-blur metric for a multimedia clip 500 does not exceed a predetermined threshold value 610, then it may be determined that video stabilization may be applied to multimedia clip 500. In particular embodiments, a predetermined value for a motion-blur metric threshold 610 may represent a value where approximately 90%, 95%, 98%, 99%, or any suitable percentage of a stabilized multimedia clip may be substantially free of motion-blur artifacts, and approximately 10%, 5%, 2%, 1%, respectively, or any suitable percentage of a stabilized multimedia clip may contain motion-blur artifacts. In particular embodiments, for a multimedia clip 500 where MBM is greater than a predetermined motion-blur metric threshold 610, greater than 5% of stabilized multimedia clip 500 may contain motion-blur artifacts, and less than 95% of stabilized multimedia clip 500 may be substantially free of motion-blur artifacts. In particular embodiments, for a multimedia clip 500 where MBM is less than a predetermined motion-blur metric threshold 610, less than 5% of stabilized multimedia clip 500 may contain motion-blur artifacts, and greater than 95% of stabilized multimedia clip 500 may be substantially free of motion-blur artifacts. In particular embodiments, determining whether to apply a video-stabilization routine includes determining whether approximately 95% or more of a multimedia clip would be substantially free of motion-blur artifacts after applying the video-stabilization routine to the multimedia clip. Although this disclosure describes particular motion-blur metrics determined from motion-blur metric functions 600, this disclosure contemplates any suitable motion-blur metric determined in any suitable fashion from any suitable motion-blur metric function 600.

In FIG. 6, motion-blur metric function 600A is relatively low, in part due to a relatively low amount of orientation change 520A that occurred during recording of multimedia clip 500A. In particular embodiments, it may be determined to apply video stabilization to multimedia clip 500A since MBMF 600A is below threshold 610A. In particular embodiments, a value for MBM determined from MBMF 600A may be below threshold 610A, and based on a value of MBM, it may be determined to apply video stabilization to multimedia clip 500A. In FIG. 6, motion-blur metric function 600B may be associated with multimedia clip 500B and determined from associated exposure time 510B and orientation change 520B. Exposure time 510B may be relatively short (e.g., multimedia clip 500B may have been recorded under bright-light conditions), and orientation change 520B may indicate a relatively large amount of camera shake while multimedia clip 500B was recorded. Motion-blur metric function 600B may be relatively low due to a relatively short exposure time 510B (e.g., approximately 0.5 ms). In particular embodiments, it may be determined to apply video stabilization to multimedia clip 500B based on a relatively low value for MBMF 600B or a low value for an associated motion-blur metric. In FIG. 6, motion-blur metric function 600C, associated with multimedia clip 500C, may indicate a small or moderate amount of motion blur in multimedia clip 500C. As an example and not by way of limitation, if a video-stabilization criteria requires that motion-blur metric function 600C not exceed threshold value 610C, then it may be determined to not apply video stabilization to multimedia clip 500C. As an example and not by way of limitation, if a motion-blur metric value determined from MBMF 600C is less than threshold value 610C, then it may be determined to apply video stabilization to multimedia clip 500C. In FIG. 6, motion-blur metric function 600D, associated with multimedia clip 500D, is relatively large, due at least in part to relatively large orientation changes 520D that occurred during recording as well as a relatively moderate (e.g., 5-10 ms) exposure time 510D. In particular embodiments, it may be determined to not apply video stabilization to multimedia clip 500D based on MBMF 600D (or a related motion-blur metric) as compared with threshold value 610D. Although this disclosure describes particular criteria for determining whether to apply video stabilization to a multimedia clip, this disclosure contemplates any suitable criteria for determining whether to apply video stabilization to a multimedia clip.

In particular embodiments, enabling or applying a video-stabilization routine may refer to sending a multimedia clip through a routine where the effects of camera shake are reduced or removed from the multimedia clip. In particular embodiments, a determination of whether to enable or disable a video-stabilization routine may be performed in real-time by mobile computing device 100 while mobile computing device 100 is recording a video. In particular embodiments, a determination of whether or not to apply a video-stabilization routine may be performed after a multimedia clip and suitable sensor information or values have been recorded. In particular embodiments, a determination of whether to enable or disable a video-stabilization routine may be performed by a mobile computing device 100 that has recorded a multimedia clip. In particular embodiments, a determination of whether to enable or disable a video-stabilization routine may be performed by another computing device different from a mobile computing device 100 that recorded the multimedia clip. As an example and not by way of limitation, a mobile computing device 100 may upload a multimedia clip to a server, and an application operating on the server or a computing device connected to the server may determine whether to enable or disable video stabilization for the multimedia clip. This disclosure contemplates any suitable determination, performed by any suitable computing device, of whether or not to apply video stabilization to a multimedia clip.

In particular embodiments, a video-stabilization routine may be implemented using feature-based stabilization where features in images are tracked from frame to frame to recover a camera's motion and then compensate for it. In particular embodiments, video stabilization may be implemented based on a sensor signal (e.g., gyroscope, accelerometer, or magnetometer) built-in or attached to a video recording device, where sensor information is recorded as a video is being recorded. In particular embodiments, information from a gyroscope may be integrated with respect to time to reconstruct a camera's orientation, and the camera's orientation information may be used in a routine to stabilize a multimedia clip. In particular embodiments, a low-pass filter may be applied to a camera's orientation information to obtain a stabilized or synthetic camera orientation, which may be used in a video-stabilization routine. Although this disclosure describes and illustrates particular techniques for implementing video stabilization, this disclosure contemplates any suitable video-stabilization techniques.

Figure 7:
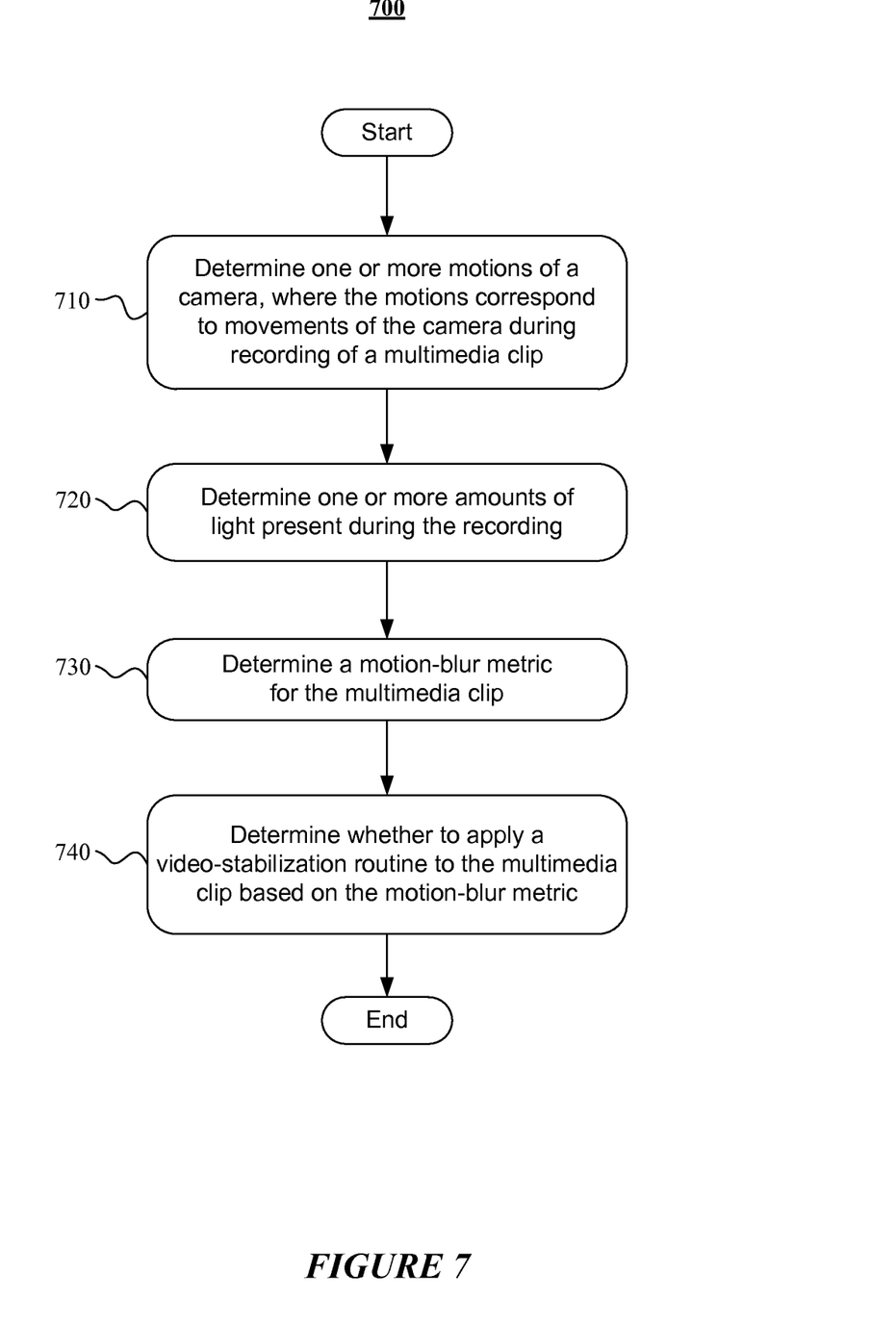
FIG. 7 illustrates an example method for determining whether to apply video stabilization to a particular multimedia clip.

FIG. 7 illustrates an example method 700 for determining whether to apply video stabilization to a particular multimedia clip. The method may begin at step 710, where one or more motions of a camera may be determined, where the motions may correspond to movements of the camera during recording of a multimedia clip. In particular embodiments, the movements of the camera during recording may be due, at least in part, to camera shake. At step 720, one or more amounts of light present during the recording may be determined. At step 730, a motion-blur metric for the multimedia clip may be determined. In particular embodiments, the motion-blur metric may be determined from the determined motions of the camera and the determined amounts of light present. At step 740, it may be determined whether to apply a video-stabilization routine to the multimedia clip based on the motion-blur metric, at which point the method may end. In particular embodiments, if the motion-blur metric is less than or equal to a predetermined value, then video stabilization may be applied to the multimedia clip. In particular embodiments, if the motion-blur metric is greater than a predetermined value, then video stabilization for the multimedia clip may not be enabled. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for determining whether to apply video stabilization to a particular multimedia clip, including the particular steps of the method of FIG. 7, this disclosure contemplates any suitable method for determining whether to apply video stabilization to a particular multimedia clip, including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
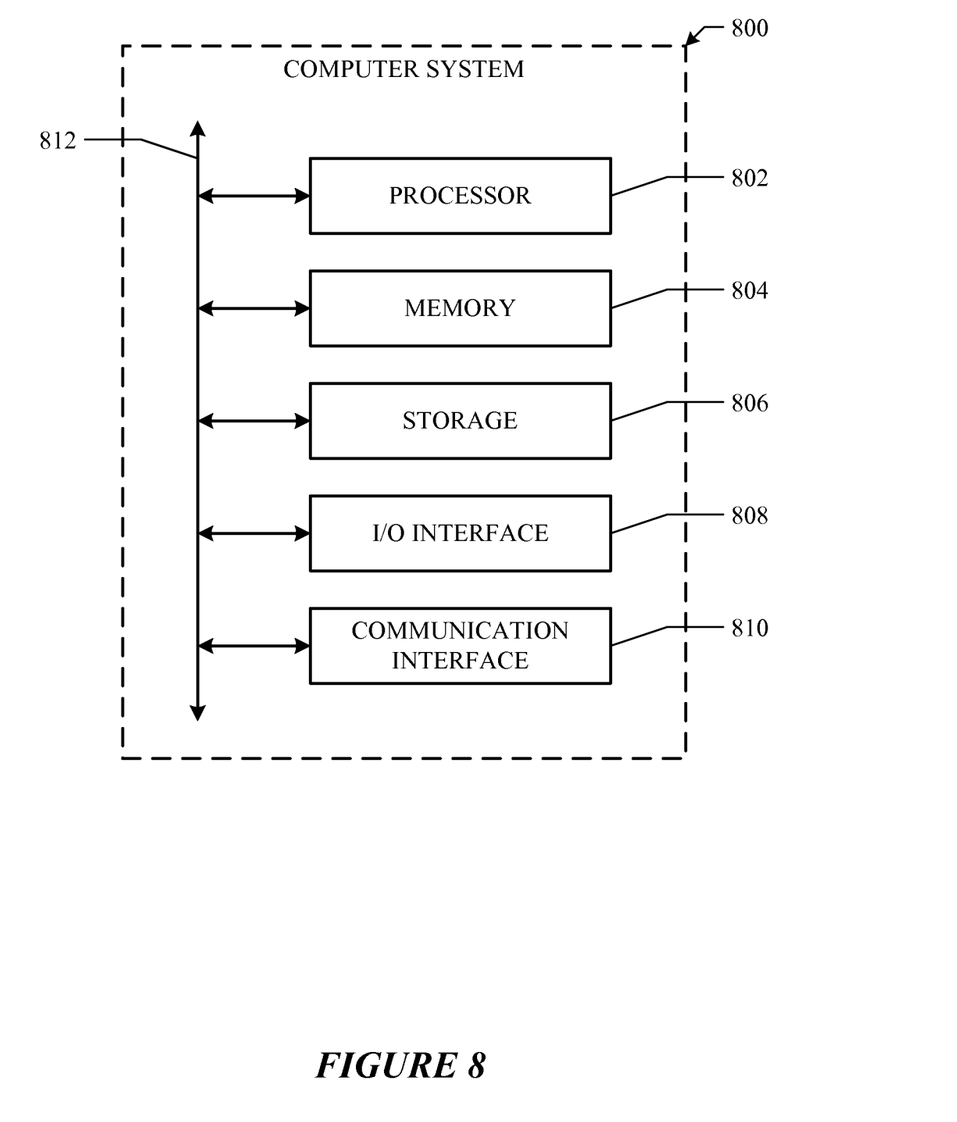
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by a computing device, determining one or more amounts of light present during recording of a multimedia clip;
    by the computing device, determining a motion-blur metric for the multimedia clip, the motion-blur metric based at least in part on the amounts of light; and by the computing device, determining whether to apply a video-stabilization routine to the multimedia clip based at least in part on the motion-blur metric.

2. The method of claim 1, wherein determining the one or more amounts of light present during the recording comprises determining an exposure time associated with one or more image frames of the multimedia clip.

3. The method of claim 1, wherein determining the one or more of the amounts of light present during the recording comprises receiving a signal from a light sensor.

4. The method of claim 1, wherein the multimedia clip is recorded by a camera, and further comprising:
by the computing device, determining one or more motions of the camera, the motions occurring during the recording of the multimedia clip.

5. The method of claim 4, wherein determining the one or more motions of the camera comprises:
by the computing device, receiving information from a motion sensor; and
by the computing device, determining, based on the received motion-sensor information, one or more rotational or translational motions of the camera.

6. The method of claim 5, wherein the motion sensor is a gyroscope, accelerometer, or magnetometer.

7. The method of claim 4, wherein the motion-blur metric is further based at least in part on the one or more determined motions of the camera.

8. The method of claim 4, wherein:
each motion of the camera is represented by a corresponding motion vector; and
determining a motion of the camera comprises determining a magnitude of a motion vector or an angle between two motion vectors.

9. The method of claim 1, wherein:
the multimedia clip is recorded by a camera; and
determining the motion-blur metric for the multimedia clip comprises determining, for one or more frames of the multimedia clip, a product of one of the one or more amounts of light and an orientation change of the camera.

10. The method of claim 1, wherein determining whether to apply the video-stabilization routine comprises determining whether the motion-blur metric is less than a predetermined threshold value.

11. The method of claim 1, wherein determining whether to apply the video-stabilization routine comprises determining whether greater than a threshold amount of the multimedia clip would be substantially free of motion-blur artifacts after applying the video-stabilization routine to the multimedia clip.

12. The method of claim 1, wherein determining whether to apply the video-stabilization routine comprises determining whether less than a threshold amount of the multimedia clip would comprise motion-blur artifacts after applying the video-stabilization routine to the multimedia clip.

13. One or more computer-readable non-transitory storage media embodying software that is operable when executed to:
determine one or more amounts of light present during recording of a multimedia clip;
determine a motion-blur metric for the multimedia clip, the motion-blur metric based at least in part on the amounts of light; and
determine whether to apply a video-stabilization routine to the multimedia clip based at least in part on the motion-blur metric.

14. The media of claim 13, wherein determining the one or more amounts of light present during the recording comprises determining an exposure time associated with one or more image frames of the multimedia clip.

15. The media of claim 13, wherein determining the one or more of the amounts of light present during the recording comprises receiving a signal from a light sensor.

16. The media of claim 13, wherein the multimedia clip is recorded by a camera, and the software is further operable to:
determine one or more motions of the camera, the motions occurring during the recording of the multimedia clip.

17. The media of claim 16, wherein determining the one or more motions of the camera comprises:
receive information from a motion sensor; and
determine, based on the received motion-sensor information, one or more rotational or translational motions of the camera.

18. The media of claim 17, wherein the motion sensor is a gyroscope, accelerometer, or magnetometer.

19. The media of claim 16, wherein the motion-blur metric is further based at least in part on the one or more determined motions of the camera.

20. The media of claim 16, wherein:
each motion of the camera is represented by a corresponding motion vector; and
determining a motion of the camera comprises determining a magnitude of a motion vector or an angle between two motion vectors.

21. The media of claim 13, wherein:
the multimedia clip is recorded by a camera; and
determining the motion-blur metric for the multimedia clip comprises determining, for one or more frames of the multimedia clip, a product of one of the one or more amounts of light and an orientation change of the camera.

22. The media of claim 13, wherein determining whether to apply the video-stabilization routine comprises determining whether the motion-blur metric is less than a predetermined threshold value.

23. The media of claim 13, wherein determining whether to apply the video-stabilization routine comprises determining whether greater than a threshold amount of the multimedia clip would be substantially free of motion-blur artifacts after applying the video-stabilization routine to the multimedia clip.

24. The media of claim 13, wherein determining whether to apply the video-stabilization routine comprises determining whether less than a threshold amount of the multimedia clip would comprise motion-blur artifacts after applying the video-stabilization routine to the multimedia clip.

25. A system comprising:
one or more processors; and
a memory coupled to the processors comprising instructions executable by the processors, the processors being operable when executing the instructions to:
determine one or more amounts of light present during recording of a multimedia clip;
determine a motion-blur metric for the multimedia clip, the motion-blur metric based at least in part on the amounts of light; and
determine whether to apply a video-stabilization routine to the multimedia clip based at least in part on the motion-blur metric.

26. The system of claim 25, wherein determining the one or more amounts of light present during the recording comprises determining an exposure time associated with one or more image frames of the multimedia clip.

27. The system of claim 25, wherein determining the one or more of the amounts of light present during the recording comprises receiving a signal from a light sensor.

28. The system of claim 25, wherein the multimedia clip is recorded by a camera, and the processors are further operable when executing the instructions to:
 determine one or more motions of the camera, the motions occurring during the recording of the multimedia clip.

29. The system of claim 28, wherein determining the one or more motions of the camera comprises:
 receive information from a motion sensor; and
 determine, based on the received motion-sensor information, one or more rotational or translational motions of the camera.

30. The system of claim 29, wherein the motion sensor is a gyroscope, accelerometer, or magnetometer.

31. The system of claim 28, wherein the motion-blur metric is further based at least in part on the one or more determined motions of the camera.

32. The system of claim 28, wherein:
 each motion of the camera is represented by a corresponding motion vector; and
 determining a motion of the camera comprises determining a magnitude of a motion vector or an angle between two motion vectors.

33. The system of claim 25, wherein:
 the multimedia clip is recorded by a camera; and
 determining the motion-blur metric for the multimedia clip comprises determining, for one or more frames of the multimedia clip, a product of one of the one or more amounts of light and an orientation change of the camera.

34. The system of claim 25, wherein determining whether to apply the video-stabilization routine comprises determining whether the motion-blur metric is less than a predetermined threshold value.

35. The system of claim 25, wherein determining whether to apply the video-stabilization routine comprises determining whether greater than a threshold amount of the multimedia clip would be substantially free of motion-blur artifacts after applying the video-stabilization routine to the multimedia clip.

36. The system of claim 25, wherein determining whether to apply the video-stabilization routine comprises determining whether less than a threshold amount of the multimedia clip would comprise motion-blur artifacts after applying the video-stabilization routine to the multimedia clip.

* * * * *